United States Patent
Sriraghavan et al.

(10) Patent No.: US 8,713,454 B2
(45) Date of Patent: Apr. 29, 2014

(54) METHOD AND APPARATUS FOR SHARING VIRTUAL WORKSPACES

(75) Inventors: Priyanka G. Sriraghavan, Tamil Nadu (IN); Lakshmi Nrusimhan N. V., Tamil Nadu (IN)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 232 days.

(21) Appl. No.: 12/823,529

(22) Filed: Jun. 25, 2010

(65) Prior Publication Data

US 2011/0320961 A1    Dec. 29, 2011

(51) Int. Cl.
*G06F 3/00* (2006.01)
*G06F 15/16* (2006.01)
*H04N 7/14* (2006.01)

(52) U.S. Cl.
USPC ........... 715/753; 715/751; 715/758; 709/205; 348/14.08

(58) Field of Classification Search
CPC ....... G06F 9/4445; G06F 9/455; H04L 29/06; H04L 63/08; H04L 67/1095; G06Q 10/101
USPC ......... 715/753, 751, 758; 709/205; 348/14.08
See application file for complete search history.

(56) References Cited

U.S. PATENT DOCUMENTS

| | | | |
|---|---|---|---|
| 5,564,062 A * | 10/1996 | Meaney et al. | 710/244 |
| 7,379,968 B2 * | 5/2008 | Schuh | 709/204 |
| 8,125,510 B2 * | 2/2012 | Agarwal et al. | 348/14.08 |
| 2006/0259586 A1 * | 11/2006 | Wood et al. | 709/219 |
| 2007/0014284 A1 * | 1/2007 | Daniels et al. | 370/389 |
| 2007/0214423 A1 * | 9/2007 | Teplov et al. | 715/751 |
| 2007/0300165 A1 * | 12/2007 | Haveliwala | 715/758 |
| 2008/0114844 A1 * | 5/2008 | Sanchez et al. | 709/206 |

* cited by examiner

*Primary Examiner* — Doug Hutton, Jr.
*Assistant Examiner* — Li Sun

(57) ABSTRACT

An approach is provided for sharing the virtual workspaces of a plurality of user devices. One of the plurality of devices is designated as the only active device. The active device submits an update of the virtual workspace of the active device. Then an update of the virtual workspaces of the other devices is initiated that includes the workspace of the active device. A request from one of the other devices to become active is granted and the previously active device is undesignated as active.

10 Claims, 10 Drawing Sheets

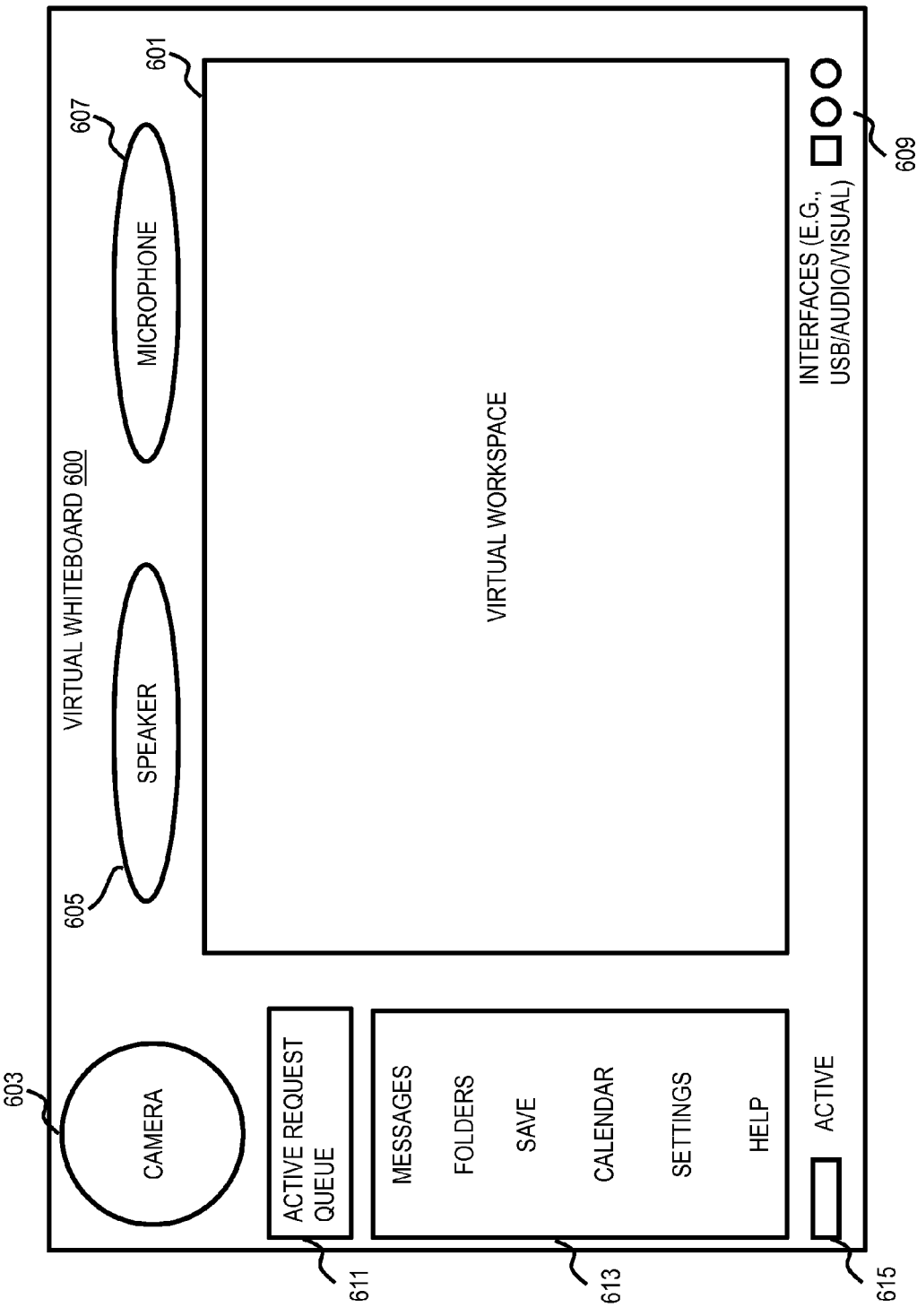

US 8,713,454 B2

METHOD AND APPARATUS FOR SHARING VIRTUAL WORKSPACES

BACKGROUND INFORMATION

With the advent of computers, interactive electronic communications, and the Internet (World Wide Web), as well as advances in high speed data transmission, has come a reinvention of conventional collaboration services and tools to enhance such efforts. It is not uncommon for users (e.g., team members) to work collaboratively from near or remote locations. However, while the available collaboration tools have expanded, the ability to efficiently work collectively and intuitively with team members has been lacking. In many cases, team members find it difficult to work with one another because of the challenges of being unable to quickly share information regarding a collective work product. Collaborative projects traditionally are accomplished through a physical whiteboard in which a member manually writes or draws on the board, perhaps in conjunction with a computer and projector to capture and modify the work product of the team. Thus, these tasks or projects requiring concurrent input from multiple users are often inefficient and difficult to control and manage in terms of scheduling and the manner in which members participate. Moreover, technological advances have not been fully leveraged.

Therefore, there is a need for an approach to enhance the collaborative work environment.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 6A-6C are diagrams of a virtual whiteboard configured to share and receive content of a virtual workspace, according to various embodiments;

DESCRIPTION OF THE PREFERRED EMBODIMENT

A preferred apparatus, method, and system for sharing virtual workspaces are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to portable electronic whiteboarding devices, it is contemplated that these embodiments have applicability to any type of electronic device capable of providing virtual workspace environments; for example, electronic drawing boards, electronic tablets, mobile devices, telephony devices, and terminal stations (e.g., desktop computers, laptop computers).

Figure 1:
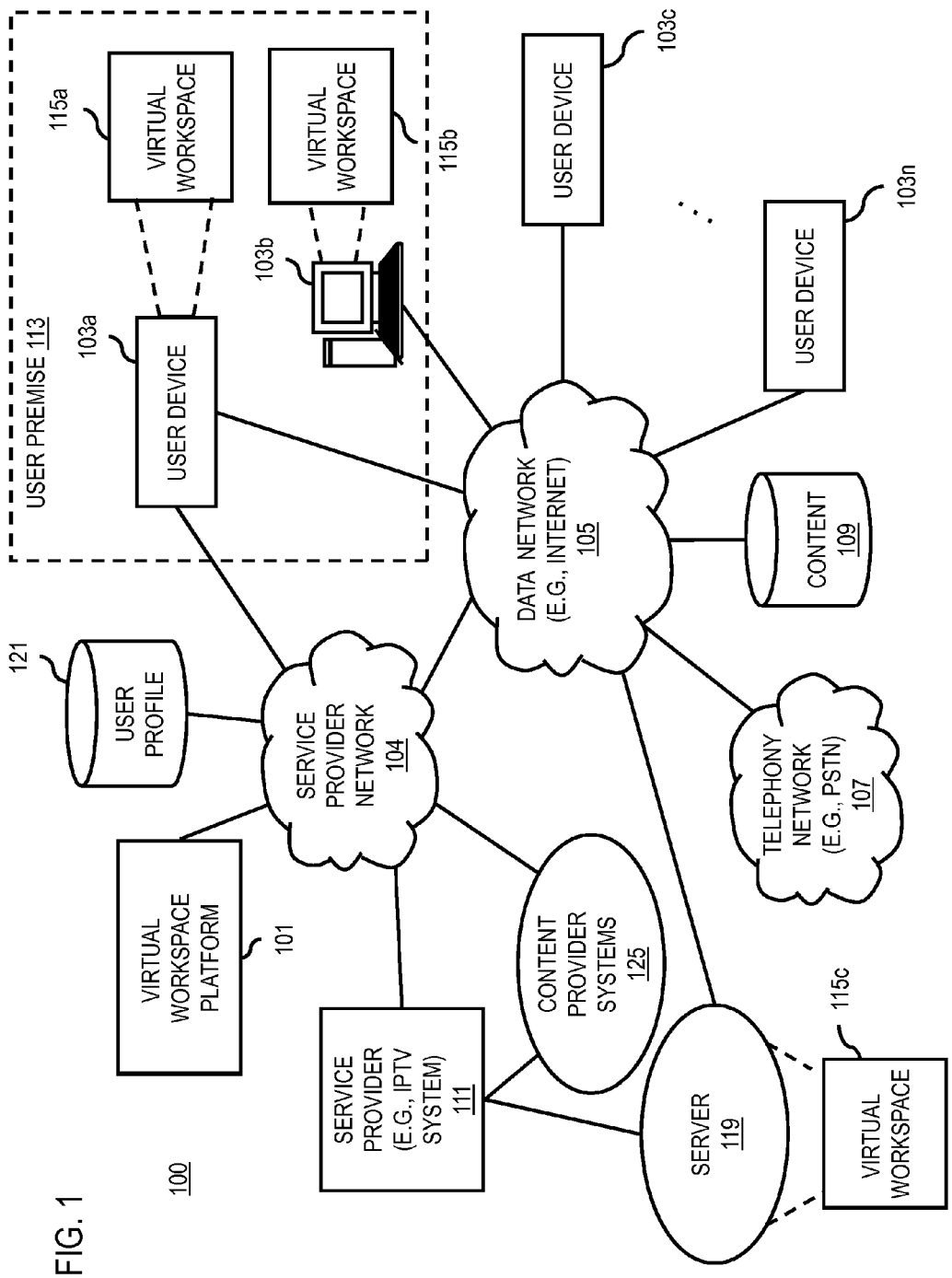
FIG. 1 is a diagram of a system capable of controlling shared access to virtual workspaces, according to an exemplary embodiment.

FIG. 1 is a diagram of a system capable of controlling the sharing of virtual workspaces among various user devices, according to an exemplary embodiment. For the purposes of illustration, system 100 includes a virtual workspace platform 101 to permit user devices 103 to collaborate effectively using an electronic whiteboarding environment. It is observed that even with the advent of electronic mail, video conferencing, Internet and high-speed data connections, individual members of collaborative teams that share a working project, may still find it challenging to work efficiently and to express their thoughts with the other members of the team. For example, participants of a video conference may find it difficult to follow along with a presenter and to share feedback to both the presenter and to the other members of the meeting.

Conventionally, individuals who have participated in video conferences, or other forms of collaborative efforts, have relied on pre-prepared materials for such events (e.g., meetings, sessions). For example, a conference presenter may prepare diagrams that describe the presenter's proposed solution or approach and forward these diagrams to the participants of the conference prior to the conference. Of course, the presenter may even forward such diagrams during the conference physically or electronically. In any scenario, the participants' ability to modify and share suggestions with the presenter and other participants is severely limited. As a result, creating a work product for editing and sharing during a video conference is not feasible. Thus, it is apparent that improvements are needed to provide collaborative team members with the ability to communicate and share information efficiently so that they can optimize their collaborative efforts.

To address this problem, system 100 of FIG. 1 enables users to share virtual workspace content among their user devices. In other words, a virtual workspace (e.g., whiteboarding) mechanism is provided by system 100 to allow the user devices to be connected and share a virtual workspace. In this manner, the users can produce a collaborative product via updates from one or more devices, whereby different designated active devices can offer modifications to the collaborative product. According to one embodiment, a service provider (e.g., conferencing provider) can accept subscribers to a whiteboarding service as part of a managed service over a service provider network 104 using the virtual workspace platform 101. Additionally, virtual workspace platform 101 that can facilitate the establishment of conferences or meetings between two or more users/participants can be provided as part of the managed service. Alternatively (or additionally), the virtual whiteboard functions can be implemented on the participant's user devices 103 via a virtual workspace module 115a-115c. Virtual workspace modules 115a-115c can be implemented as software that is executed by one or more processors (e.g., one or more processors of a handheld device, desktop computer, etc.). According to other embodiments, virtual workspace module 115a-115c may be deployed as a combination of hardware, software, and/or firmware.

In one embodiment, service provider network 104 integrates the user devices 103a-103n with that of telecommunications and computing environments, thereby broadening the scope of devices and sources available to individuals for obtaining content from remote devices and servers. Consequently, network operators are relieved from the burden and expense of providing parallel avenues to content, by enabling users, via user devices to receive shared data content accessible over traditional transmission systems (e.g., broadcast, cable, satellite, fiber optic cable) as well as over a data network 105 (e.g., packet-based network), which has connectivity to a telephony network 107 (e.g., Public Switched Telephony Network (PSTN)). For example, a user may specify a virtual workspace to include content that has been requested and received from an external data source (e.g., Internet website, server, etc.). Although in one embodiment, the user device is tailored to optimize the operation of a whiteboarding application; however, it is contemplated that various embodiments have applicability to any device capable of processing digital content and video, audio, and/or multimedia streams.

Under the scenario of FIG. 1, a user (or customer) premise 113 may include various user devices 103a and 103b, in which device 103b may be a computer terminal. The user devices 103a-n are configured with virtual workspace modules 115a-115c, which may operate on a peer-to-peer basis or as clients to a server application 119.

By way of example, the virtual workspace content of the user devices may include any form of textual information, images, or data (e.g., electronic documents, graphic arts, etc.), pre-recorded media content, data communication services content (e.g., commercials, advertisements, videos, movies, songs, audio books, etc.), Internet (or Web)-based content (e.g., streamed video, streamed audio), and/or any other electronic data form. Users may create new content and/or modify existing content; such shared content can be referred to as a "community work product" in that multiple users possess the capability to contribute to the final content.

By way of example, user premise 113 can be the site of a meeting in which a number of users (of which only two are shown) are gathered in the same physical facility (e.g., conference room). In this scenario, each user may be equipped with a digital whiteboarding device (i.e., user devices 103a and 103b). The user devices 103a and 103b can invoke their respective virtual workspace modules 115a and 115b, which then permit sharing of the content of their virtual workspaces. Once the virtual workspace modules 115a and 115b gain knowledge of all the participants, control of the shared workspace is governed according to a predetermined scheme; e.g., in which a "control token" is given to one of the devices 103a and 103b at a time. The predetermined scheme can utilize any known arbitration algorithm, such as a round-robin scheme, a contention scheme, or fairness scheme, to designate an active device. As such, the active device 103a has the control of the virtual workspace, wherein the user of this device 103a can provide input to modify (or update) the subject content while the device is active.

In one embodiment, the virtual workspace is regulated via virtual workspace platform 101, which is maintained by the service provider 111. Consequently, the user of the active device 103a can provide update(s) to the service provider 111 concerning the virtual workspace to allow the service provider 111 to have the ability to share the user's virtual workspace 115a with the other user devices 103b-103n. Such updates can be performed on, for example, a continuous or continual basis to the virtual workspace platform 101; additionally or alternatively, the updates are directly communicated to the other user devices 103b-103n. It is also contemplated that the user may select to send the update at various predetermined intervals, at manually selected times, or at the conclusion of the user's session as the active device.

According to one embodiment, the first user to sign into (or logon) the platform 101 of the service provider is designated as the active user; hence, that active user's whiteboard is designated as the active whiteboard. This first user then creates, for example, a work product (e.g., diagram, image, schematic, etc.) in the virtual workspace of the active device. This user of the active device can set the associated whiteboard to provide continuous updates of the virtual workspace so that the platform 101 can supply the updates to the whiteboards of the other users according to a predetermined frequency or interval. Moreover, designation of the active user or device can be modified upon request by a non-active whiteboard. That is, if one of the other non-active users seeks to share desired modifications to the diagram with the other users, this non-active user can submit a request to the virtual workspace platform 101 to become active. The platform 101, in turn, may grant such request according to a prescribed protocol. During the transition of active control, upon becoming the active whiteboard user, this new active user has the option to accept or reject (disregard) the content provided in the last received update from the previously active device. As a default, any such updates can be automatically accepted until the new active user is properly installed.

In certain embodiments, any participant, at any time during a whiteboarding session, may elect to save an update of the work product to a local (at the user's whiteboard) or remote memory for future use. For example, a participant who is the third active user of a session (and who elected to save the content of the last update transmitted by the first active participant, while electing to not save the content of the last update from the second user), may or may not elect to replicate the content saved from the first user's update.

It is contemplated that virtual workspace platform 101 may embody many forms and may include multiple and/or alternative components. A more detailed explanation of the process provided by a service provider is depicted in FIG. 2.

In a typical scenario, an individual or organization (e.g., a subscriber of the service provider network 104) may establish a link with a service provider 111 to conduct data sharing collaborative sessions with multiple participants using multiple respective user devices. A graphical user interface (GUI) is then presented at a user premise 113 via a user device 103a (e.g., electronic whiteboard). The graphical user interface of the user device 103a may provide particular details of the established connection and of the collaborative session (e.g., start-time, number of users, system and device requirements, etc.). These details may be provided by the service provider 111 or stored locally on the user device.

Figure 2A:
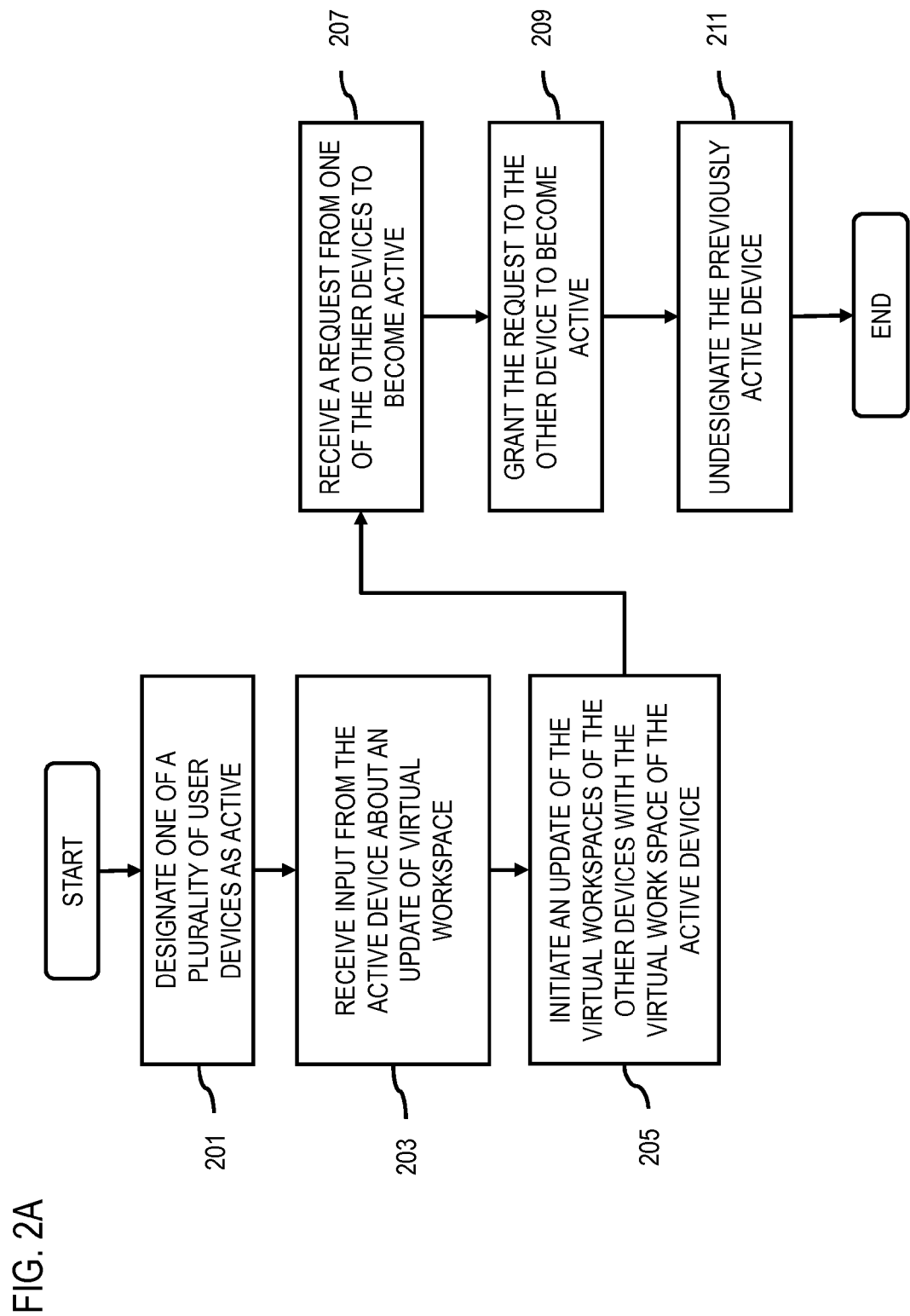
FIGS. 2A and 2B are, respectively, a flowchart of a process for providing shared virtual workspaces among multiple user devices, and a diagram showing an active virtual workspace, according to various embodiments.
Figure 2B:
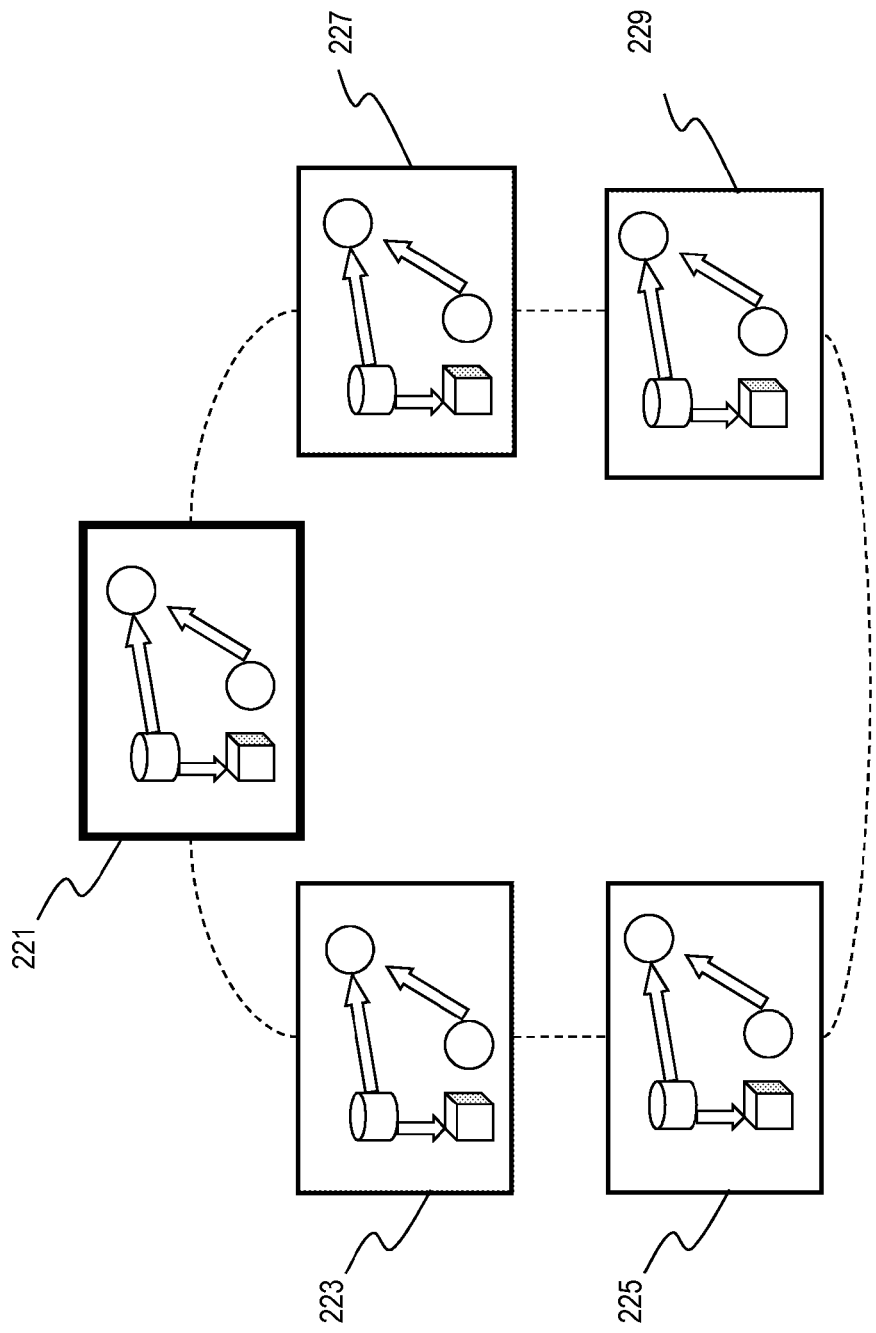

FIGS. 2A and 2B are, respectively, a flowchart of a process for providing shared virtual workspaces among multiple user devices, and a diagram showing an active virtual workspace, according to various embodiments. In one embodiment, the initial (or first) user to join a session becomes the active or chairman for the session and the associated whiteboard (user device) is designated as the active device. The remaining participants of the session are able to connect to the first user's user device, in such a way that all user devices 103a-103n are connected to a virtual shared workspace. The other participants may be connected to the first user's user device in any number of ways. For example, the other participants may connect by selecting the first user's name from a list of other users, by using the first user's network address (e.g., Internet Protocol (IP) address), by selecting the session from a list of other sessions that are accessible via the service provider, etc. As further examples for connecting all participants to the session, the first user could publish the user's IP address for others to view, could communicate this IP address to others manually, etc. When all of the participants are connected, the session may then begin. According to one embodiment, the user devices 103a-103n can establish an ad-hoc network of devices, including the virtual workspace platform 101. By way of example, assuming the user devices 103a-103n are wireless communication devices with routing functionality, they can be a self-configuring network. As such, user devices 103a-103n can employ any standard, known ad hoc routing protocols to discover each other. In this manner, users may effectively collaborate in an ad-hoc manner.

As depicted in FIG. 2A, in step 201, one user device, e.g., 103a (shown in FIG. 1), among multiple user devices is designated as active. In addition to known computing devices, e.g., laptops, notebook computers, etc., the user devices can be whiteboarding device that is customized for collaborative computing (as illustrated in FIG. 6). The designation of the active device can be determined by any number of predetermined schemes; e.g., based on roles of the users, the locations of the devices, organizational structure, fairness algorithms, etc. The remaining user devices 103b-103n are designated as non-active. In one embodiment, control of the shared workspace is effected by a control token that is given only to the currently active device. The user of the active device maintains control of the shared workspace content for the duration of the designation. Accordingly, the user of the active user device may choose to incorporate modifications and updates to the shared virtual workspace content. Upon saving any updates, the active user device 103a may share the virtual workspace content 115a with the other user devices by submitting the update to the virtual workspace platform 101, as in step 203. In step 205, the virtual workspace platform 101 then initiates an update of the virtual work spaces of the non-active user devices 103b-103n with the virtual workspace 115a of the active device 103a.

The virtual workspace platform 101 may also receive at least one request from one of the non-active devices 103b-103n to be designated as the active device 103a, per step 207. The request is placed in an active request queue and processed according to a predetermined protocol in the settings of the virtual workspace platform 101 to establish an order of priority in the active request queue. The protocol for determining the order of priority may include, in one embodiment, various ranking factors such as, but are not limited to, time of request, seniority of the user, urgency of request, etc. In step 209, the previously non-active user device (e.g., device 103b) that submitted the at least one request is designated as the active device 103a. Subsequently, in step 211, the previously active device 103a is undesignated as the active device. The described process can be executed such that the functions of the platform 101 is performed by anyone of the user devices 103—e.g., the first active user device 103a.

FIG. 2B shows a scenario in which virtual workspaces 221-229 are engaged in a collaborative task. In this example, workspace 221 is active (as highlighted in bolded lines). Hence, the non-active workspaces 223-229 assume the content of the workspace 221 and any associated updates. Active control can be assumed by anyone of the other non-active workspaces 223-229 upon initiation of a request for such control by the corresponding workspace. If multiple requests are generated, then they are appropriately queued for treatment according to a predetermined algorithm.

Turning back to FIG. 1, as discussed previously, the content that may be created and edited in the virtual workspace 115 of the user devices 103 can be generated by any text processing and graphic arts applications, any audio-visual content (e.g., broadcast television programs, VOD programs, pay-per-view programs, IPTV feeds, DVD related content, etc.), pre-recorded media content, data communication services content (e.g., commercials, advertisements, videos, movies, songs, images, sounds, etc.), Internet services content (streamed audio, video, or pictographic media), and/or any other equivalent media form. In this manner, the service provider 111 may provide (in addition to the content provided directly by the users), at a user's request, content obtained from other sources, such as Internet services content, one or more third-party content provider systems 125, content residing in a repository 109 or accessible via server 119, as well as available via one or more packet-based networks 105 or telephony networks 107, etc.

Service provider 111 can provide content that is retrieved over the packet-based network 105, from the user devices, or from other sources at the request of a user device. For instance, at the request of a user device, service provider 111 may retrieve and provide building schematics from a remote sever 119 to be included in the content of the user's virtual workspace 115. Additionally, the provided content may include streamed audio and/or video from broadcast providers. It is noted that the content can be any type of data or information that is provided from any source having connectivity to system 100.

In this manner, a virtual workspace module 115a may be executable, for example, as one or more user interfaces capable of local implementation on any user device 103a-d (e.g., a computer, telephony device, mobile device, or other like mechanism). The virtual workspace module 115a also enables users to easily, effectively, and intuitively browse and/or search outside sources of content by a graphical user interface of content accessible over the service provider network 104 or the data network 105. Thus, exemplary embodiments of a virtual workspace module 115a may be provided through navigation shell applications, e.g., menu applications having options corresponding to different functions. By way of example, computer devices may include desktop computers, notebook computers, servers, terminal workstations, gaming systems, customized hardware, or other equivalent apparatus. Mobile devices may include personal digital assistants (PDA), pocket personal computers, smart phones, tablets, handsets, portable gaming systems, and customized hardware, as well as other mobile technologies capable transmitting data.

The user devices 103a-103n can communicate using the packet-based network 105 and/or the telephony network 107. These systems can include: a public data network (e.g., the Internet), various intranets, local area networks (LAN), wide area networks (WAN), the public switched telephony network (PSTN), integrated services digital networks (ISDN), other private packet switched networks or telephony networks, as well as any additional equivalent system or combination thereof. These networks may employ various access technologies including cable networks, satellite networks, subscriber television networks, digital subscriber line (DSL) networks, optical fiber networks, hybrid fiber-coax networks, worldwide interoperability for microwave access (WiMAX) networks, wireless fidelity (WiFi) networks, other wireless networks (e.g., 3G wireless broadband networks, mobile television networks, radio networks, etc.), terrestrial broadcasting networks, provider specific networks (e.g., a VERIZON® FIOS® network, a TiVo network, etc.), and the like. Such networks may also utilize any suitable protocol supportive of data communications, e.g., transmission control protocol (TCP), internet protocol (IP), file transfer protocol (FTP), telnet, hypertext transfer protocol (HTTP), asynchronous transfer mode (ATM), socket connections, Ethernet, frame relay, and the like, to connect user devices 103a-135n to various sources of content. Although depicted in FIG. 1 as separate networks, packet-based network 105 and/or telephony network 107 may be completely or partially contained within service provider network 104. For example, service provider network 104 may include facilities to provide for transport of packet-based and/or telephony communications.

By way of example, user devices 103a-103n can remotely access one or more servers (e.g., server 119), via a communication interface (not illustrated), configured to execute multiple instances of a virtual workspace module 115c. That is, virtual workspace module 115c may be provided in a distributed fashion using, for instance, client-server architectures, such as implemented by enterprise application service providers (ASP). It is noted that ASP models (and other like architectures) offer system scalability in terms of administrative scalability, geographic scalability, and/or load scalability. Thus, distributed environments are attractive modes for disseminating system 100 functionality to a broad spectrum of users and devices.

For example, server 119 can be an "online" system capable of communicating with one or more third-party web servers (not illustrated), content repositories (e.g., repository 109), or equivalent facilities, to provide users various avenues to locate, specify, receive, and/or share content that is accessible over a data network (e.g., packet-based network 105). For example, exemplary embodiments of virtual workspace module 115c may comprise hypertext markup language (HTML) user interfaces or JAVA™ applets stored on server 119 and accessed via world-wide-web pages. These interfaces are particularly useful in extending system 100 functionality to devices having limited resources (e.g., PDAs, handsets, thin-clients, etc.). In alternative embodiments, server 119 is collocated with and/or integrated into service provider 111. As such, multiple users, interfaces, and instances of virtual workspace module 115c can be simultaneously realized through system 100.

In the example of FIG. 1, user devices 103a-103n are located at one or more user premises (e.g., user premise 113), and geospatially associated with one or more regions. User devices 103a-103b may be configured to communicate with and receive signals and/or data streams from a service provider 111 (or other transmission facility) in response to processes of one or more virtual workspace module(s) 115a-115c (virtual workspace applications). These signals include results of applying search or browse operations on the available content (e.g., building schematics) and any related data (e.g., metadata) retrieved over a data network (e.g., service provider network 104, packet-based network 105, and/or telephony network 107), as well as conventional audio/video broadcast content (e.g., streaming audio/visual content).

Service provider 111 can include one or more content servers (not illustrated) and/or data repositories (not shown). Alternatively, user profile repository 121, content repository 109, or server 119 may be accessed via one or more service provider networks 101 and/or packet-based networks 105. In one embodiment, the user profile repository 121 stores user settings, preferences, and configuration information for the virtual workspace 115a. In this manner, user devices 103a-103n can utilize any suitable technology to draw, receive, and/or transmit media content from/to a service provider 111 or other content source/sink. A more detailed explanation of an exemplary user device is provided with respect to FIGS. 3 and 4.

In an exemplary embodiment, user devices 103a-103n can draw, receive, and/or transmit content information for their virtual workspaces from (or to) multiple sources, thereby alleviating the burden on any single source, e.g., service provider 111, to gather, supply, or otherwise meet the content demands of any user or premise. Thus, particular embodiments enable authenticated third-party content provider systems 125, and servers (e.g., server 119) to transmit content accessible over a data network to user devices 103a-103d either apart from, or in conjunction with, service provider 111. Such content may include any user requested content including text data, graphic arts, audio/visual data, etc.

The requested content may be distinguished (or otherwise categorized) utilizing metadata included therewith or appended thereto. Metadata can be generally considered data about data; but more specifically, it can be utilized to describe all aspects of the content distributed by system 100. Namely, metadata can include descriptions about: data aspects (file name, type, administrator, size, location, version, or include timestamps, mode bits, arbitrary attribute-value pairs, etc.), titles, activities/events, individuals and organizations involved, intended participants, geospatial identifications (intended zip codes, school districts, communities, etc.), locations of supplementary information and processes, access methods, limitations, timing of activities/events (e.g., start/end dates), as well as motivations, policies and rules. As such, metadata may be utilized by various components of system 100 for control and/or ranking purposes. In particular embodiments, system 100 may structure and encode metadata to describe characteristics of the content-bearing entities to aid in the identification, discovery, assessment, and management of the requested and shared content by virtual workspace modules 115a-115c. For example, the virtual workspace module 115a may apply retrieved information from the metadata corresponding to the factors the virtual workspace module 115a is using to determine the relative positioning of the content in a graphical user interface and/or in the virtual workspace.

In various embodiments, service provider network 104 may include one or more processing modules (not shown) for acquiring and transmitting requested content (including content accessible over a data network) from the third-party content provider systems 125, or servers 119 over one or more of the networks 104, 105, 107, to particular user devices 103a-103d and at the user's request. Accordingly, service provider network 104 may include facilities to support compression/decompression, coding/decoding, modulation/demodulation, optical/electrical conversion, and analog/digital conversion, as well as any other suitable signal processing and/or transmission operation. Further, service provider network 104 can optionally support end-to-end data encryption and related content streaming services such that only authorized users are able to access the requested and shared content referenced therein.

Accordingly, system 100 may include an authentication module (not shown) configured to perform authorization/authentication services and determine whether users or content sources are indeed subscribers to, or providers of, the sharing content service. An authentication schema may require a user name and password, a key access number, a unique machine identifier (e.g., media access control (MAC) address), etc., as well as a combination thereof. Once a subscriber has authenticated a presence on system 100, the user may bypass additional authentication procedures for executing later applications (e.g., content streaming instances). Data packets, such as cookies, may be utilized for this purpose. Thus, once a user device or content source is authenticated, connections between the user devices 103a-103n and the content sources may be established directly or through the service provider 111.

In other embodiments, authentication procedures on a first user device (e.g., user device 103a) may identify and authenticate a second device (e.g., terminal 103b) communicatively coupled to, or associated with, the first device. For example, when the first user is designated as chairman of a session, the first user's device authenticates subsequent participants according to an established protocol. Further, the authentication module (not shown) may grant users the right to receive shared content from multiple system 100 sources by revoking existing sets of digital certificates associated with a particular provider, and issuing new sets of digital certificates mapped to a second provider. In this regard, a user device (e.g., user device 103a) may receive new requested content from a second source, whereas a previous session may be automatically closed when the "old" or prior certificates associated with the first source are revoked. This enables users to initiate secure sessions at any of the user devices 103a-103d linked to system 100, whether or not the user device (or end terminal) belongs to that individual user. It is additionally contemplated that multiple rights sessions may exist concurrently.

Figure 3:
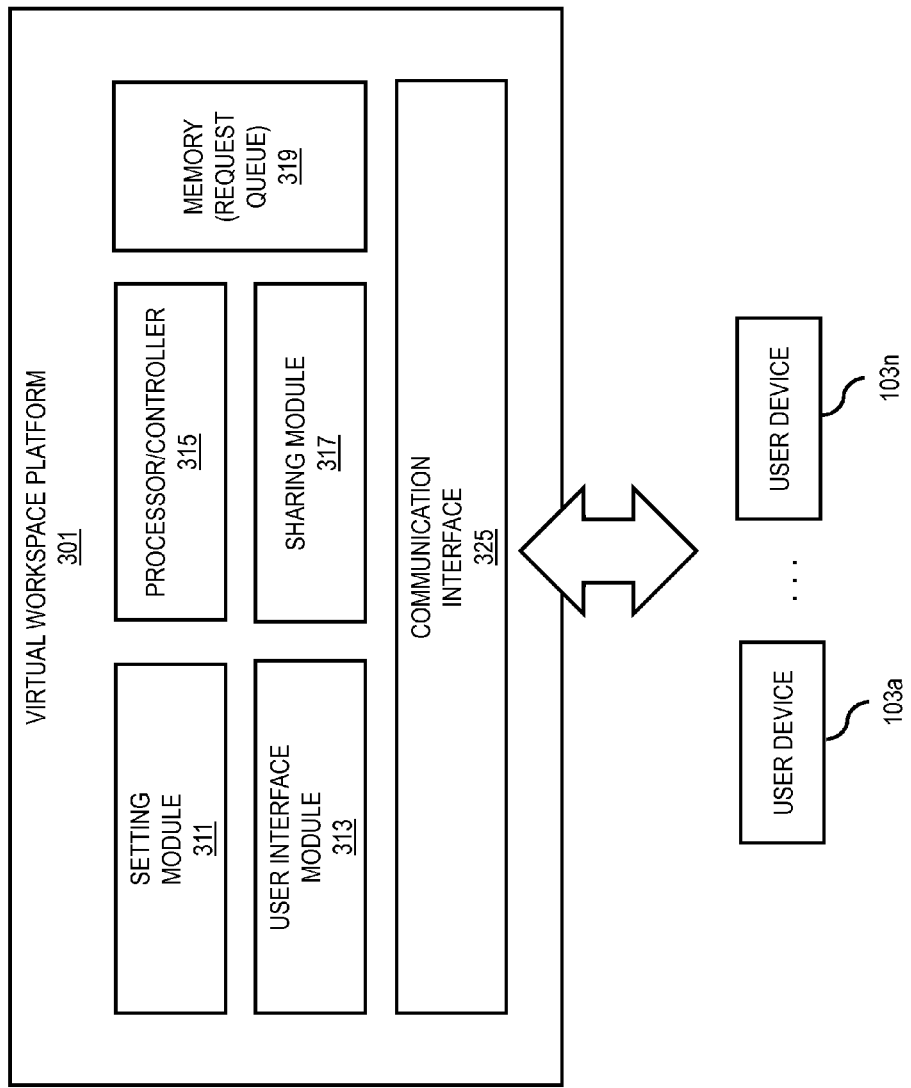
FIG. 3 is a diagram of a virtual workspace platform configured to control and provide shared virtual workspaces among user devices, according to an exemplary embodiment.

FIG. 3 is a diagram of a virtual workspace platform configured to control and provide shared virtual workspaces among user devices, according to an exemplary embodiment. By way of example, the virtual workspace platform 301 may be configured with a setting module 311, which may provide and permit modification of various parameters. For example, the setting module 311 may include session metadata profiling the number of participants and session restrictions. The settings may be modified by a service provider, or by a user, via a user interface module 313. A processor/controller 315 of the virtual workspace platform can be included to provide the functions of the virtual workspace—e.g., executing of an electronic whiteboarding application. The processor 315 can also regulate the session settings for the collaborative The virtual workspace platform 301 may also be configured with a sharing module 317. The sharing module 317, in conjunction with the processor 315, is configured to grant requests to become active, and to govern the timing of the update requests from the active device and the sharing of the updates with the non-active user devices. Communication with the user devices 103a-103n may be provided via a communication interface 325.

The virtual workspace platform 301 may also be configured to include a local memory 319, which may be configured as a request queue to store requests for an active status. The request queue can be established according to a predetermined queue size; also, the queuing mechanism can be defined by a maximum queue wait time, whereby requests are automatically purged from the queue after expiration of the wait time value. Further, a prioritization scheme can be implemented in which the requests are prioritized—e.g., based on the role of the users, location of the user device, queue structure (e.g., Last-In-First-Out (LIFO), First-In-First-Out (FIFO), etc.). In one embodiment, the sharing module 317 is configured to execute the prioritization scheme to grant the various requests. Additionally, the local memory 319 can store the various setting parameters and the shared virtual workspace content, as well any requested content from an external source, which may be in the form of textual data, graphic arts, images, media, etc.

Figure 4:
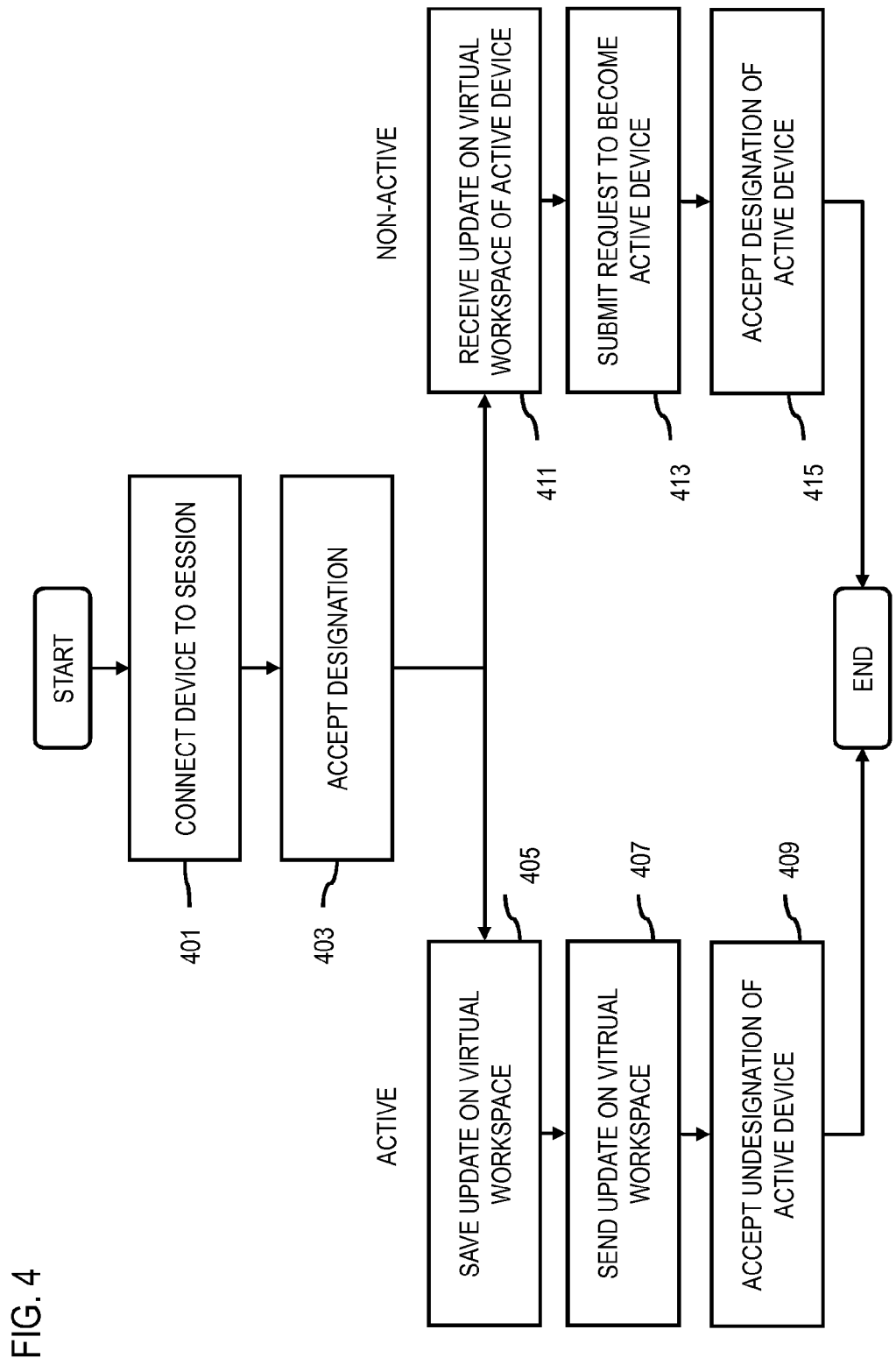
FIG. 4 is a flowchart of a process for connecting and sharing virtual workspaces of among multiple user devices, according to an exemplary embodiment.

FIG. 4 is a flowchart of a process for connecting and sharing virtual workspaces of among multiple user devices, according to the user devices of the flowchart depicted in FIG. 2. For the purposes of explanation, this process is executed by a user device and is described with respect to the system of FIG. 1 in which a plurality of user devices are configured to share virtual workspace content via a service provider network. In step 401, a user device is connected to a collaborative session that is configured for two or more participants. Depending on an algorithm of a predetermined scheme, the user's device accepts either an active or non-active designation, in step 403. As discussed above, during the collaborative session, control of the shared workspace is designated using a token mechanism, whereby a control token is provided to a single currently active device at a time. As such, if the user device is designated as active, the user has the ability to save a modification or update to the subject content of the virtual workspace, as in step 405. As shown, the process for the active device 103a involves steps 405-409, and the non-active devices 103b-103n follow steps 411-415. It is noted that the processes for the active device 103a and the non-active devices 103b-103n can occur concurrently. The saving of the update can be performed at any time while the active device has control of the shared workspace. The saving of the shared workspace content can be set at designated times, or on a continuous basis, according to the predetermined scheme and/or the preference of the user of the active device. For example, the saving of an update can occur at set intervals, whenever the virtual workspace is modified, or at the completion of the user's presentation, etc.

In step 407, any modification or update that is saved in step 405 can be shared with the other user devices. The modified or updated virtual workspace content is sent as an update over the service provider network 104 for sharing with the other user devices 103b-103n. The sending of the update may also be set in the settings of the virtual workspace platform 101 to occur, for example, at intervals, whenever an update is submitted, or at the completion of the user's presentation, depending on the predetermined scheme and/or the preference of user of the active device 103a. The designated active device 103a can remain active until the user relinquishes this status or until a predetermined time limit expires. If a predetermined time limit is set for the active status duration, the user of the active device may choose to relinquish his active status before the expiration of the predetermined time limit. If one or more users of the non-active devices 103b-103n submit a request to become the active device, the current active device can accept an undesignation of active device in step 409.

As discussed above, in one embodiment, only one user device in a session may be designated active. Accordingly, and as depicted in FIG. 4, a user device that connects to a collaborative session in step 401 may be designated as non-active in step 403, depending on the predetermined scheme. By way of example, any user device that connects to a session after a first user device connects to the session will be designated as non-active, in step 403. In step 411, the non-active user device receives an update on virtual workspace content of the active device. If the user of a non-active device desires to make modifications, additional updates, or suggestions to the shared virtual workspace content, the user may submit a request to have the non-active device become the active device (step 413). The request to designate the non-active device as the active device may be submitted to a virtual workspace platform and placed in an active request queue. The request and any other requests from other users of non-active devices 103b-103n are processed according to a predetermined protocol in the settings of the virtual workspace platform 101, to establish an order of priority for the queue. The protocol for determining the order of priority may include various ranking factors such as, but are not limited to, time of request, seniority of the user, urgency of request, etc. In step 415, the previously non-active user device is designated as the active device. Subsequently, the previously active device accepts an undesignation of active device.

Figure 5:
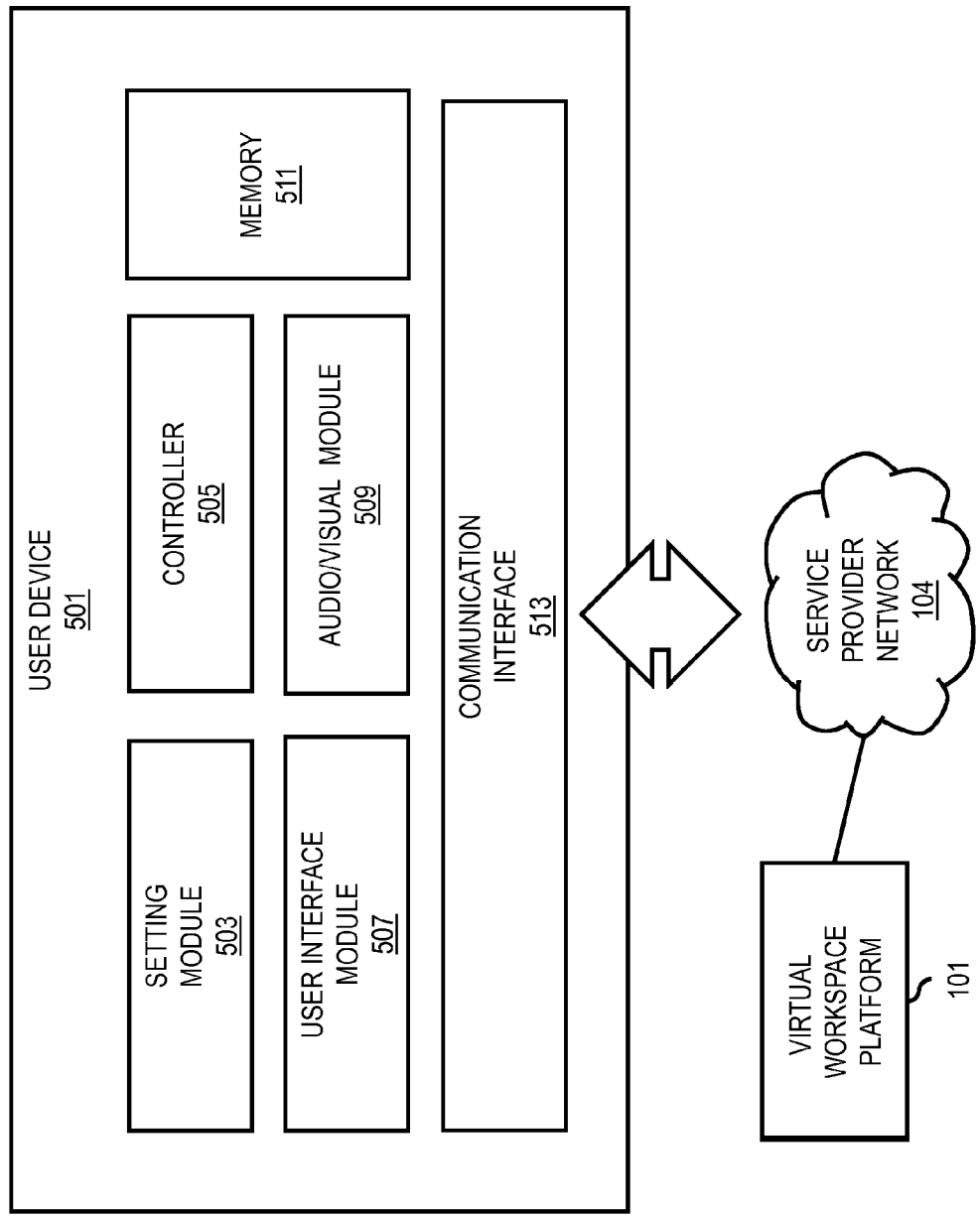
FIG. 5 is a diagram of a user device configured to share and receive content of a virtual workspace, according to an exemplary embodiment.

FIG. 5 is a diagram of a user device 501 that is configured to share and receive content of virtual work spaces, in an exemplary embodiment. The user device 501 may be configured with a setting module 503 to provide various parameters of the user device. The various parameters may include, but are not limited to, personal preferences, security settings, update timing, etc. A controller 505 may be configured with the user device 501 to govern the settings and functions of the user device 501. The user device 501 may also be configured with a user interface module 507 for permitting a user to enter and modify various settings of the setting module 503. An audio/video module 509 may be included for controlling audio and visual content, including receiving streaming audio/video content of the current active user. The user device may also be configured with a local memory 511 for storing the various setting parameters and the updated content of the active user device, as well any user requested content from external sources, which may be in the form of textual data, graphic arts, images, media, etc. The user device 501 may include a communication interface 513 for communicating with a service provider 104.

Figure 6C:
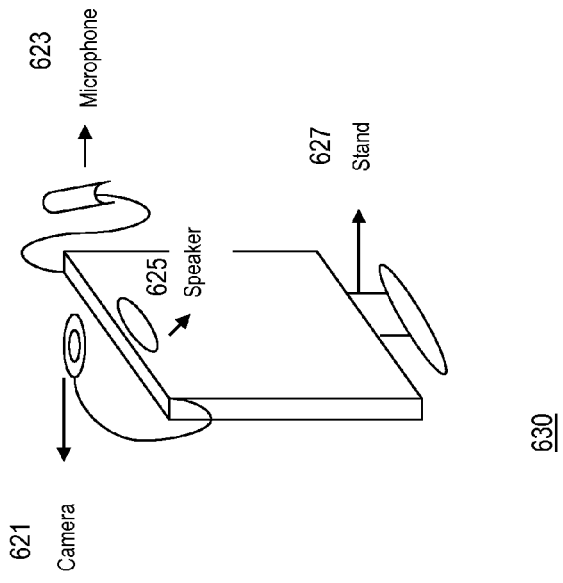
Figure 6B:
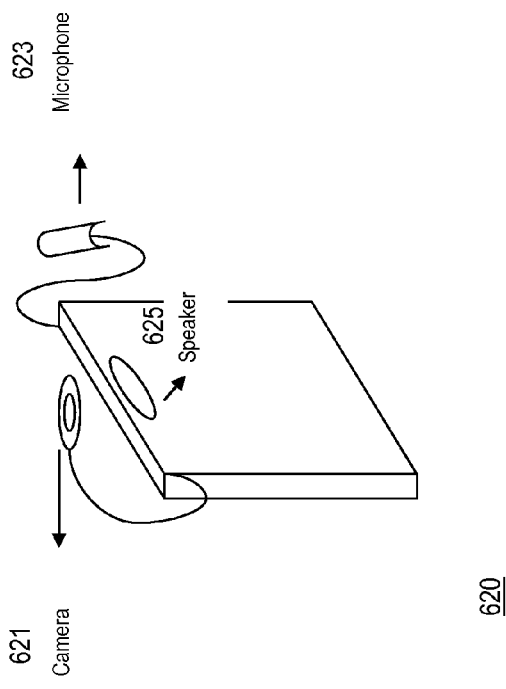

FIGS. 6A-6C are diagrams of a virtual whiteboard configured to share and receive content of a virtual workspace, according to various embodiments. As seen in FIG. 6A, a virtual whiteboard 600 can be implemented as a portable device that may be handheld or supported by a support frame (shown in FIGS. 6B and 6C, respectively). The whiteboard 600 includes a display area 601 that represents the virtual workspace that become active (i.e., capable of sending update of the virtual workspace) when the whiteboard 600 is designated active. In one embodiment, the display area 601 may be a touch screen. Additionally, the user can maintain a "my virtual workspace" in which personal notes can be maintained, such that the display area 601 implements a split screen, or permits the use to toggle back and forth between the two views. According to one embodiment, the user may submit the "my virtual workspace" for sharing (assuming the present device is active).

Also, the whiteboard 600 may include a camera 603, speaker 605, and/or a microphone 607 to enhance communicative efforts with other session participants. For example, the user may view a streaming video of the current active user, and/or record any video/audio feed for later use. Of course, the user may also elect to broadcast for the duration that the user is active to the other participants via a streaming audio/visual feed. Accordingly, the whiteboard 600 may include various forms of audio, video and other data connections/interfaces (e.g., Universal Serial Bus) 609. It is noted that not all participants are required to use same type of user device, but may use any of the above discussed user devices (e.g., virtual whiteboard, telephony device, terminal station, etc.). Also, although only certain components are shown, it is recognized that the device 600 include other components as well (shown in FIGS. 7 and 8); for instance, these other components may include a power supply, one or more processors, audio/video adapters, input/output interfaces, communication interface(s), one or more memories, peripheral interfaces, etc.

The whiteboard 600 may also include an active request queue display 611 that presents all of the requests for an active designation that have been submitted by users of user devices and the queued order of such requests. The active request queue display 609 can allow the user of the whiteboard 600 to monitor the order of priority in the current queue. The display of the active request queue display 609 may also display the current active device, as well as a listing of all connected devices and/or users. In addition, the whiteboard 600 may include an "active" indicator 615 that illuminates when the whiteboard 600 is designated active. The whiteboard 600 may also include a home display 613 that may include various interactive icons that allow a user to control and operate the whiteboard 600. In exemplary embodiments, the home display may include a message menu, storage menu, saving menu, real time calendar, settings menu, and a help menu, among other interactive features.

In exemplary embodiments, the whiteboard 600 may have a unique name that is associated with an IP address. The IP address may be used to facilitate the connection of other participants to session. For example, the user of the whiteboard 600 may provide the user's IP address to other participants so that they may easily connect into the session. The whiteboard may have various other functions and features, such as the ability to receive and review electronic messages, store received and created content, schedule feature sessions, adjust user, system, font, and security settings, and seek external help concerning the device and/or server provider.

As shown in FIG. 6B, an electronic whiteboard device 620 can be figured such that the device 620 has a camera 621 and a microphone 623 that are not integrated, but separate devices. A speaker 625 is shown as embedded or integrated in the device 620; however, it is contemplated that the speaker 625 may be a separate peripheral device as well. In FIG. 6C, whiteboard device 630 employs a stand 627.

The described processes and arrangement, in certain embodiments, advantageously leverages technology to convenient and efficiently enable collaboration in a virtual workspace environment.

One of ordinary skill in the art would recognize that the processes described above may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below.

Figure 7:
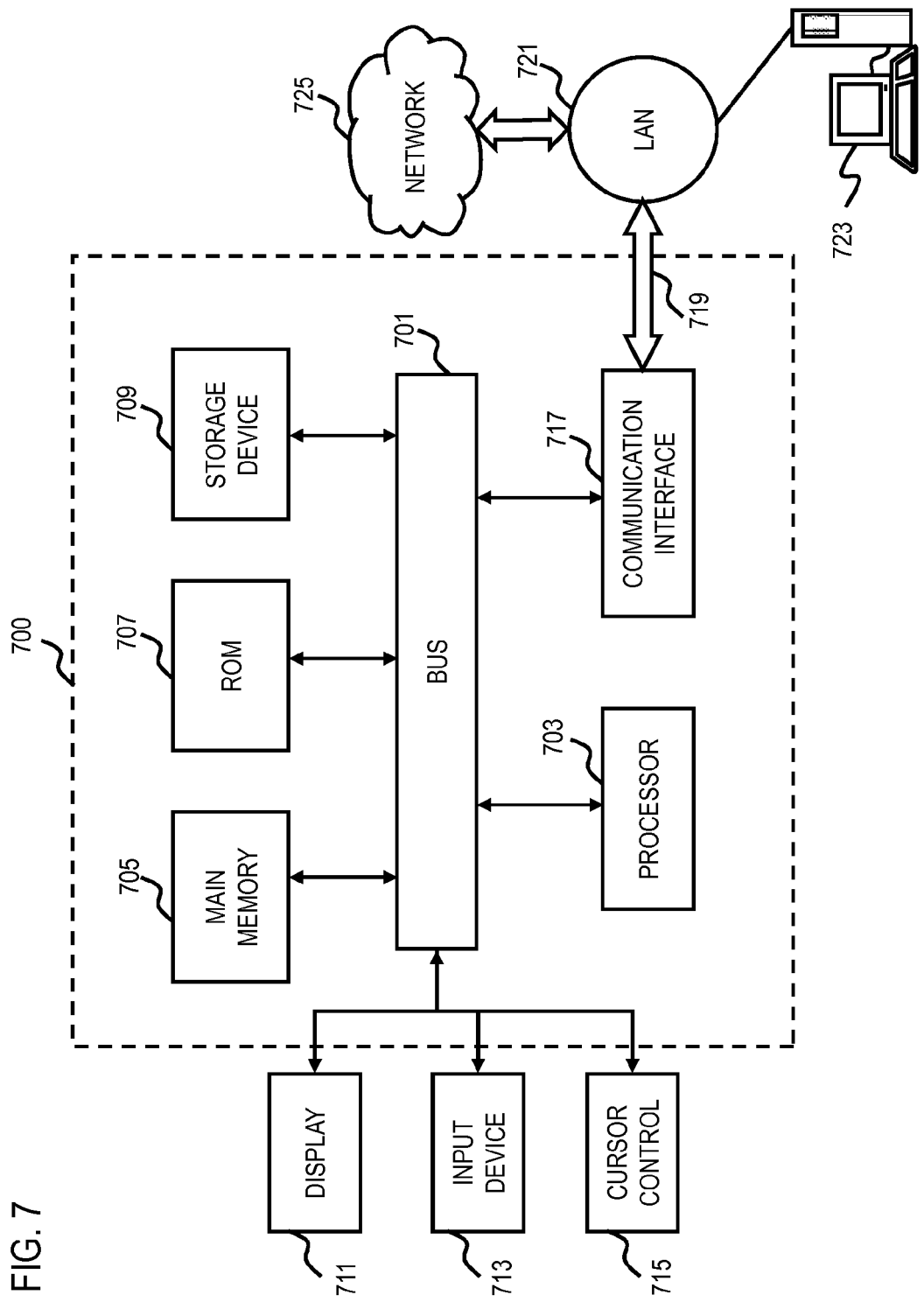
FIG. 7 is a diagram of a computer system that can be used to implement various exemplary embodiments.

FIG. 7 illustrates computing hardware (e.g., computer system) upon which an embodiment according to the invention can be implemented. The computer system 700 includes a bus 701 or other communication mechanism for communicating information and a processor 703 coupled to the bus 701 for processing information. The computer system 700 also includes main memory 705, such as random access memory (RAM) or other dynamic storage device, coupled to the bus 701 for storing information and instructions to be executed by the processor 703. Main memory 705 also can be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to an embodiment of the invention, the processes described herein are performed by the computer system 700, in response to the processor 703 executing an arrangement of instructions contained in main memory 705. Such instructions can be read into main memory 705 from another computer-readable medium, such as the storage device 807. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the invention. Thus, embodiments of the invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the invention through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 8:
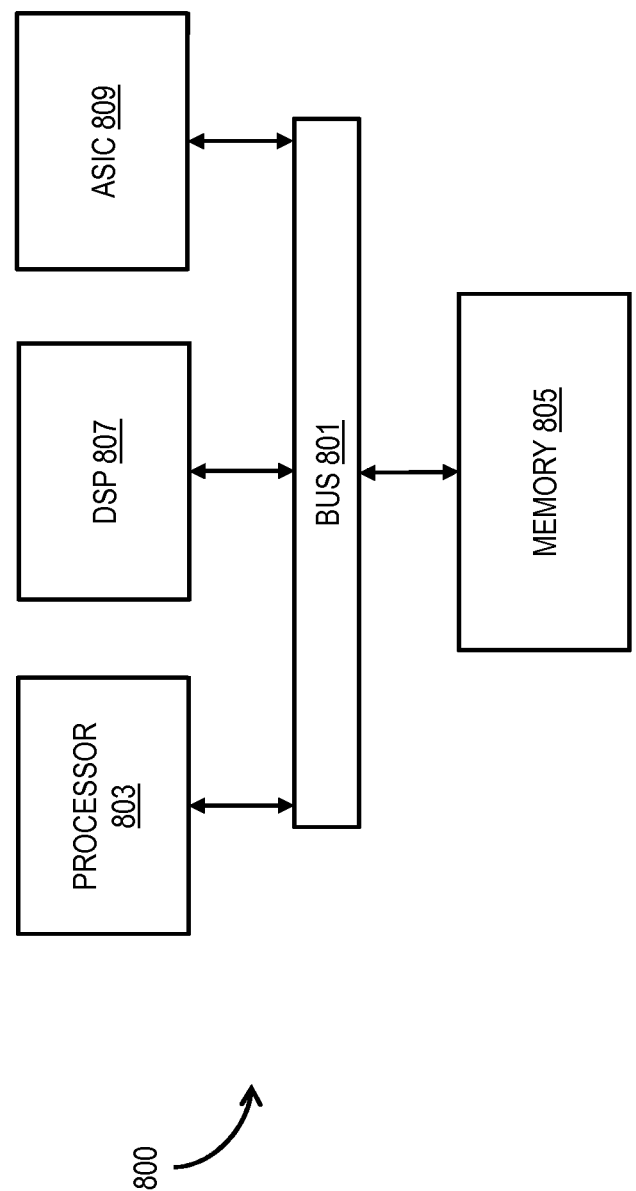
FIG. 8 is a diagram of a chip set that can be used to implement various exemplary embodiments.

FIG. 8 illustrates a chip set 800 upon which an embodiment of the invention may be implemented. Chip set 800 is programmed to present a slideshow as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of FIGS. 2 and 4.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 1107 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to presenting a slideshow via a set-top box. The memory 805 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   designating one of a plurality of devices as active, each device being configured to provide a virtual workspace during a virtual workspace session;
   receiving input from the active device about an update of the virtual workspace of the active device; and
   initiating an update of the virtual workspaces of the plurality of devices with the virtual workspace of the active device,
   wherein only one device can be active at a time, and only the active device is permitted to update the virtual workspace of the active device,
   wherein designating one of the plurality of devices as the active device is carried out at a virtual workspace platform remote from each of the plurality of devices,
   wherein the plurality of devices and the virtual workspace platform are connected to each other via a data communication network,
   wherein one or more of the plurality of devices is configured to save the update of the virtual workspace of the active device to either a local or remote memory,
   wherein the active device is configured to initiate the update of the virtual workspaces of the plurality of devices to a restored virtual workspace that reflects any saved update of the virtual workspace of any previous active device by sending the saved update to the virtual workspace platform for distribution to the plurality of devices,
   wherein any one of the plurality of devices upon becoming a new active device is configured to have an option to reject a last received update of the virtual workspace from the active device immediately preceding the new active device and use the update of the virtual workspace received prior to the last received update,
   wherein each of the plurality of devices includes an active request queue display that displays all requests for an active designation that have been submitted by users of the plurality of devices and a queued order of the requests, and
   wherein the active request queue display further displays a current active device, as well as a listing of all connected devices and users of the connected devices.

2. The method of claim 1, wherein the virtual workspace provides an electronic whiteboard.

3. An apparatus comprising:
   at least one processor;
   at least one memory including computer program code;
   the at least one memory and the computer program code configured to, with the at least one processor, cause the apparatus to perform at least the following:
   designate one of a plurality of devices as active, each device being configured to provide a virtual workspace during a virtual workspace session;
   receive input from the active device about an update of the virtual workspace of the active device; and
   initiate an update of the virtual workspaces of the plurality of devices with the virtual workspace of the active device,
   wherein only one device can be active at a time, and only the active device is permitted to update the virtual workspace of the active device,
   wherein designating one of the plurality of devices as the active device is carried out at a platform remote from each of the plurality of devices,
   wherein the plurality of devices and the platform are connected to each other via a data communication network,
   wherein one or more of the plurality of devices is configured to save the update of the virtual workspace of the active device to either a local or remote memory,
   wherein the active device is configured to initiate the update of the virtual workspaces of the plurality of devices to a restored virtual workspace that reflects any saved update of the virtual workspace of any previous active device by sending the saved update to the platform remote from the plurality of devices for distribution to the plurality of devices,
   wherein any one of the plurality of devices upon becoming a new active device is configured to have an option to reject a last received update of the virtual workspace from the active device immediately preceding the new active device and use the update of the virtual workspace received prior to the last received update,
   wherein each of the plurality of devices includes an active request queue display that displays all requests for an active designation that have been submitted by users of the plurality of devices and a queued order of the requests, and
   wherein the active request queue display further displays a current active device, as well as a listing of all connected devices and users of the connected devices.

4. The apparatus of claim 3, wherein the virtual workspace provides an electronic whiteboard.

5. A method comprising:
initiating establishment of communications with one or more devices, each configured to collaborate using a virtual workspace of a virtual workspace session;
generating a request to be active for transmission to a virtual workspace platform;
receiving from the virtual workspace platform a grant to be active in response to the request;
updating a local virtual workspace; and
initiating transmission of the update to the one or more devices to synchronize the local virtual workspace with corresponding ones of the virtual workspaces,
wherein only one device of the one or more devices can be active at a time and only the update of the local virtual workspace of the active device is transmitted to the one or more devices,
wherein the virtual workspace platform is remote from each of the one or more devices,
wherein the virtual workspace platform is in communication with each of the one or more devices via a data communication network,
wherein the one or more devices are configured to save the update of the virtual workspace of the active device to either a local or remote memory,
wherein the active device is configured to update of the virtual workspace of the one or more devices to a restored virtual workspace that reflects any saved update of the virtual workspace of any previous active device by sending the saved update to the virtual workspace platform for distribution to the one or more devices,
wherein any one of the one or more devices upon becoming a new active device is configured to have an option to reject a last received update of the virtual workspace from the active device immediately preceding the new active device and use the update of the virtual workspace received prior to the last received update,
wherein each of the plurality of devices includes an active request queue display that displays all requests for an active designation that have been submitted by users of the plurality of devices and a queued order of the requests, and
wherein the active request queue display further displays a current active device, as well as a listing of all connected devices and users of the connected devices.

6. The method of claim 5, wherein the one or more devices includes the virtual workspace.

7. The method of claim 5, wherein the virtual workspace platform is managed by a service provider.

8. An apparatus comprising:
at least one processor;
at least one memory including computer program code; and
a virtual workspace,
the at least one memory and the computer program code configured to, with the at least one processor, cause the apparatus to perform at least the following:
initiate establishment of communications with one or more devices, each configured to collaborate using a virtual workspace of a virtual workspace session;
generate a request to be active for transmission to a virtual workspace platform;
receive a grant to be active in response to the request;
update a local virtual workspace; and
initiate transmission of the update to the one or more devices to synchronize the local virtual workspace with corresponding ones of the virtual workspaces,
wherein only one device of the one or more devices can be active at a time and only the update of the local virtual workspace of the active device is transmitted to the one or more devices,
wherein the virtual workspace platform is remote from each of the one or more devices,
wherein the virtual workspace platform is in communication with each of the one or more devices via a data communication network,
wherein the one or more devices are configured to save the update of the virtual workspace of the active device to either a local or remote memory,
wherein the active device is configured to update of the virtual workspace of the one or more devices to a restored virtual workspace that reflects any saved update of the virtual workspace of any previous active device by sending the saved update to the virtual workspace platform for distribution to the one or more devices, and
wherein any one of the one or more devices upon becoming a new active device is configured to have an option to reject a last received update of the virtual workspace from the active device immediately preceding the new active device and use the update of the virtual workspace received prior to the last received update,
wherein each of the plurality of devices includes an active request queue display that displays all requests for an active designation that have been submitted by users of the plurality of devices and a queued order of the requests, and
wherein the active request queue display further displays a current active device, as well as a listing of all connected devices and users of the connected devices.

9. The apparatus of claim 8, wherein the one or more devices includes the virtual workspace.

10. The apparatus of claim 8, wherein the virtual workspace platform is managed by a service provider.

* * * * *